Aug. 16, 1927.
K. BAUMANN
1,639,481
FLEXIBLE COUPLING
Filed Nov. 13, 1923
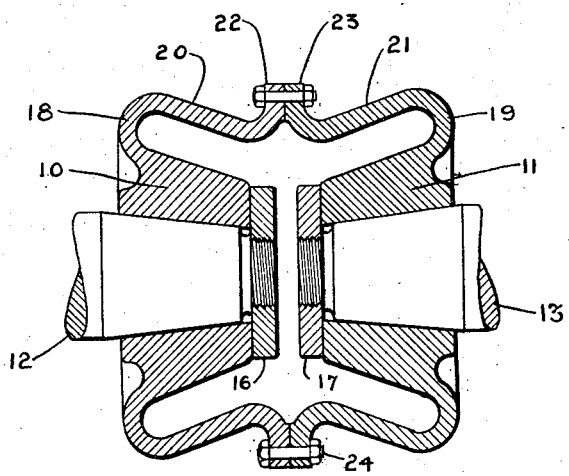
Karl Baumann
INVENTOR
WITNESSES:
BY
ATTORNEY

Patented Aug. 16, 1927.

1,639,481

UNITED STATES PATENT OFFICE.

KARL BAUMANN, OF URMSTON, ENGLAND, ASSIGNOR TO WESTINGHOUSE ELECTRIC AND MANUFACTURING COMPANY, A CORPORATION OF PENNSYLVANIA.

FLEXIBLE COUPLING.

Application filed November 13, 1923, Serial No. 674,575, and in Great Britain December 5, 1922.

My invention relates to shaft couplings, particularly to couplings of the flexible type, and it has for an object to provide apparatus of the character designated which shall combine simplicity of manufacture with efficiency in operation and which shall permit the adjacent shaft ends being arranged in closely spaced relation. It has for a further object to provide a coupling which shall permit of either shaft with its associated half coupling being removed without requiring the displacement of the adjacent shaft and its associated half coupling.

These, and other objects, may be attained by the employment of the apparatus hereinafter described and illustrated in the accompanying drawing in which the figure is a longitudinal section of a shaft coupling constructed in accordance with my invention.

As shown in the drawing, the coupling comprises hub members 10 and 11 which are secured respectively to shafts 12 and 13 by nuts 16 and 17. United to the hub members 10 and 11 and preferably formed integrally therewith are resilient diaphragms 18 and 19, and united thereto are torque-transmitting members 20 and 21 which surround the hub members 10 and 11 and terminate in the connecting flanges 22 and 23. The flanges 22 and 23 are joined by a plurality of bolts 24. The resilient diaphragms 18 and 19 are preferably of such shape as to give the maximum amount of flexibility to the coupling with regard to angular and eccentric displacement of the shafts to be coupled.

Preferably, the torque-transmitting members 20 and 21 are of substantially conical formation, tapering from a maximum diameter at or near where they join the resilient diaphragms to a minimum where they merge into or join the connecting flanges, and the portions thereof carrying the flanges are arranged to overhang the adjacent ends of the hub portion to an extent depending upon the desired degree of separation of the shafts. This arrangement is preferred as it results in the attainment, for a given overall diameter, of a maximum of flexibility with a minimum of weight and cost. Instead of being conical, the torque-transmitting members 20 and 21 may be cylindrical. The resilient diaphragms 18 and 19 may be plane, conical, or of a shape obtained by the rotation of a circular or other arc, or, by a combination of these forms, and may be disposed in any suitable position with respect to the hub member but preferably at or near the end remote from the end of the shaft. The torque-transmitting members may merge into or join the diaphragms in the form of a curve or abruptly at an angle. Preferably, each half of the coupling is machined out of a solid forging, but other methods of manufacture may obviously be employed.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a flexible coupling for rotary members, the combination of coupling heads adapted to be secured to the members, a sleeve-like, torque transmitting member enveloping a head and having an inwardly-extending curved portion integral with the outermost marginal portion of the same head, and means for connecting the torque transmitting member to the other head.

2. A resilient coupling for rotary members comprising coupling heads adapted to be secured to the members and having a torque transmitting sleeve member, said sleeve member having an annular concave radial portion whose innermost margin is integral with the head and whose outermost margin is connected to the other head.

3. A resilient coupling for rotary members comprising coupling heads adapted to be secured to the members, a conico-cylindrical torque transmitting member for each head, said torque transmitting members diverging outwardly from the central portion of the coupling and connecting with the outermost marginal portions of the respective heads, and means for connecting the torque transmitting members at their converging ends.

4. A flexible coupling for shafts comprising coupling heads secured to each of the shafts, each of said coupling heads having a unitary formed head portion and a flexible and torque transmitting portion, the flexible and torque transmitting portion extending radially from the hub portion, thence longitudinally towards the center of the coupling and thence radially outward, and means for joining together the ends of the flexible and torque transmitting portions.

5. In a flexible coupling for shafts, the combination of coupling heads rigidly secured to each of the shafts, each of said coupling heads having a hub portion and an integrally formed flexible and torque transmitting portion, the flexible and torque transmitting portion extending radially outward from the hub portion, thence longitudinally towards the center of the coupling and thence radially outward to its termination, and means for connecting the terminals of the two flexible and torque transmitting portions together.

In testimony whereof, I have hereunto subscribed my name this 23rd day of October 1923.

KARL BAUMANN.